No. 753,346. PATENTED MAR. 1, 1904.
A. YATES.
FEEDER FOR CORN HUSKING MACHINES.
APPLICATION FILED JULY 14, 1902.
NO MODEL. 2 SHEETS—SHEET 1.
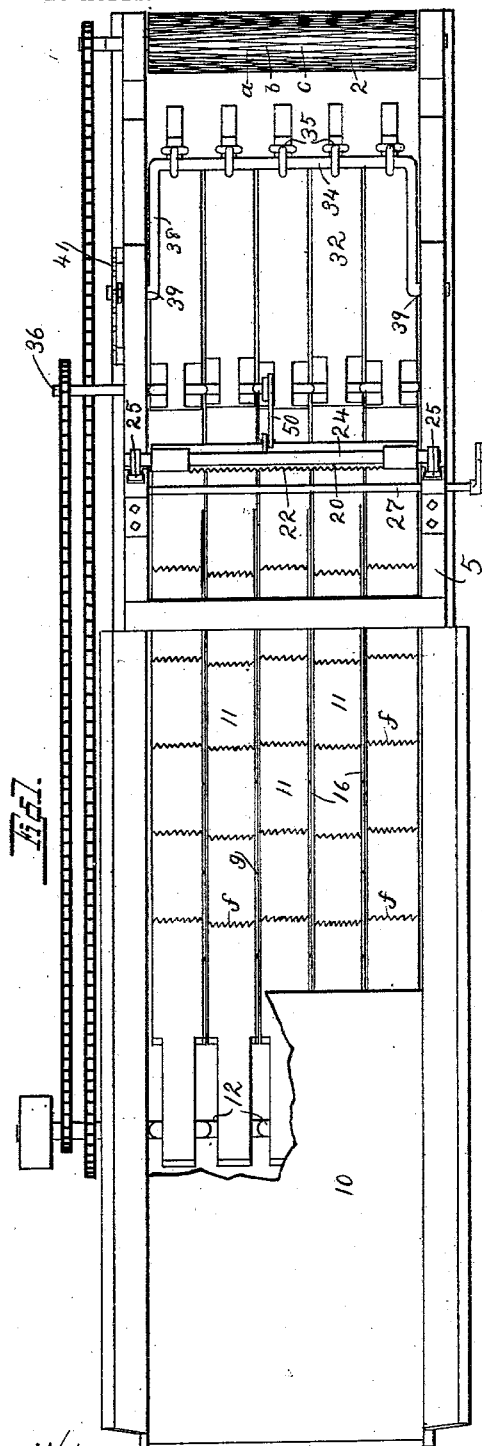
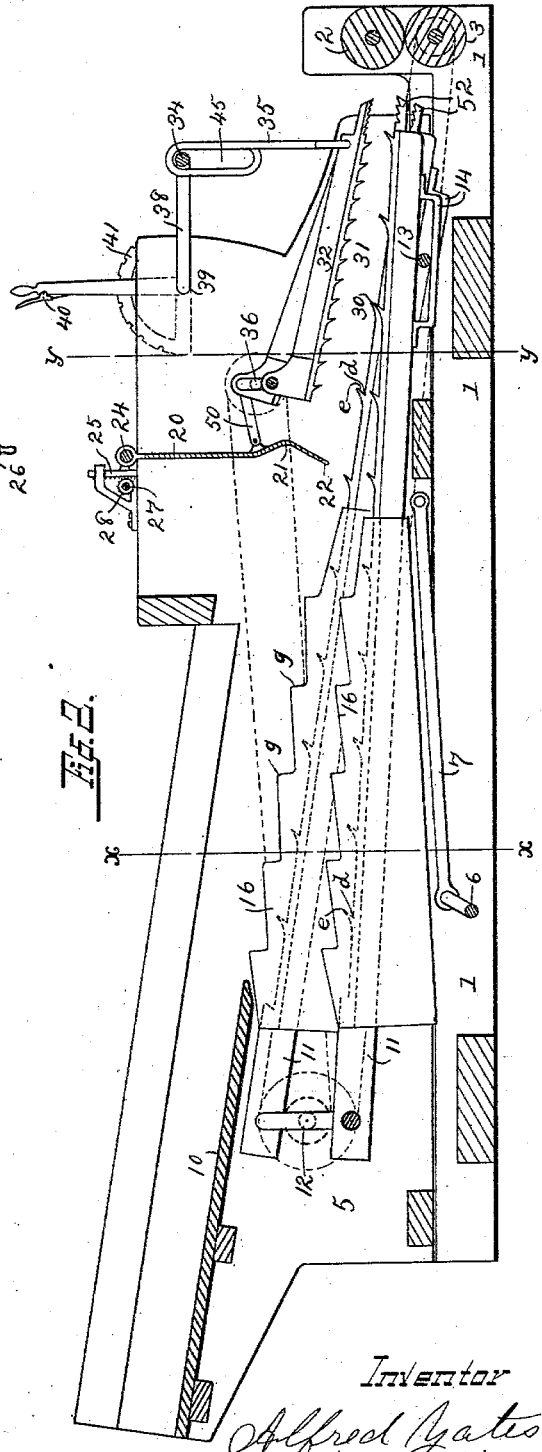
Witnesses:
Inventor
Alfred Yates
By Erwin & Wheeler
Attorneys.

No. 753,346. PATENTED MAR. 1, 1904.
A. YATES.
FEEDER FOR CORN HUSKING MACHINES.
APPLICATION FILED JULY 14, 1902.
NO MODEL. 2 SHEETS—SHEET 2.
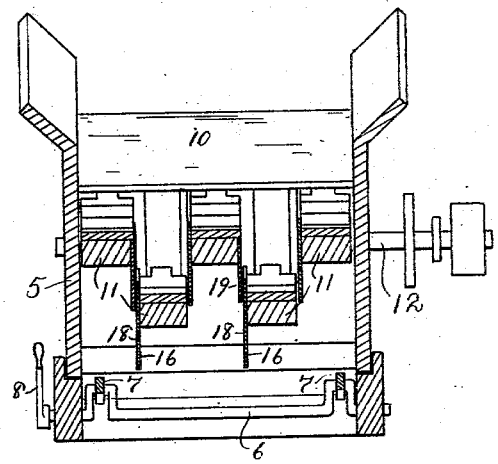
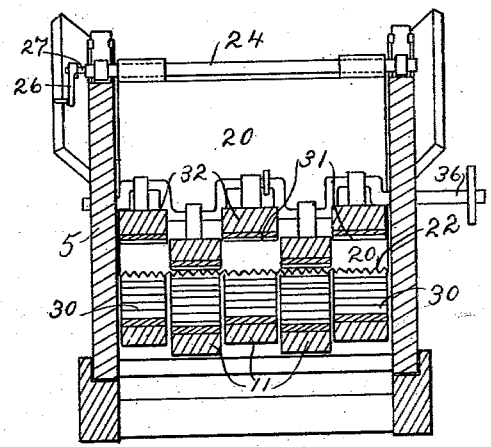
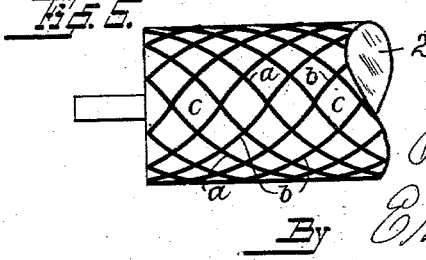

No. 753,346. Patented March 1, 1904.

UNITED STATES PATENT OFFICE.

ALFRED YATES, OF MILTON, WISCONSIN.

FEEDER FOR CORN-HUSKING MACHINES.

SPECIFICATION forming part of Letters Patent No. 753,346, dated March 1, 1904.

Application filed July 14, 1902. Serial No. 115,393. (No model.)

*To all whom it may concern:*

Be it known that I, ALFRED YATES, a citizen of the United States, residing at Milton, county of Rock, and State of Wisconsin, have invented new and useful Improvements in Feeders for Corn-Husking Machines, of which the following is a specification.

My invention relates to improvements in feeders for corn-husking machines.

The operation of feeding corn-husking machines with stalks from which the ears have not been stripped is materially different from that of feeding threshing-machines with straw, owing to the fact that the cornstalks are large and heavy, which prevent them from being successfully shaken up, loosened, or distributed by ordinary distributing devices.

The object of my invention is to provide means for cutting the bands of the bundles and distributing the stalks without lifting or throwing them, whereby the stalks are left upon the conveyer in a longitudinal position until fed thereby between the snapping-rollers.

In the following description reference is had to the accompanying drawings, in which—

Figure 1 is a top view of my invention. Fig. 2 is a longitudinal sectional view of the same. Fig. 3 is a cross-sectional view drawn on line *x x* of Fig. 2, and Fig. 4 is a cross-sectional view drawn on line *y y* of Fig. 2.

Like parts are identified by the same reference characters throughout the several views.

1 is a stationary bed, from which the snapping-rollers 2 and 3 are supported.

5 is a conveyer-frame movably mounted in the bed 1 and adapted to be adjusted longitudinally thereof by means of a crank-shaft 6 and connecting-rods 7, the crank-shaft 6 being provided with a lever 8, Fig. 3, whereby the same may be manipulated.

10 is a receiving board or platform located at the upper or front end of the conveyer-frame. The stalks are advanced from this platform to the snapping-rollers by means of a series of inclined parallel feeding-bars 11, the upper ends of which are journaled to the crank-arms of a multiple crank-shaft 12, while their lower ends are supported upon a rod 13, a bracket 14 being employed to hold each of the bars to the rod. The upper surfaces of the bars 11 are provided with notches *d*, forming shoulders *e* for the advancement of the stalks, the upper angle of the shoulder *e* being serrated, as shown at *f* in Fig. 1. Where the bars 11 are formed of wood, the notched portion may be conveniently formed of metal secured thereto, as illustrated in the drawings; but the bars may be formed entirely of metal, if desired.

For cutting the bands I provide blades 16, which are secured to the respective bars, as best shown in Fig. 3, these blades being provided with notches, as shown in Fig. 2, to form teeth *g*, the latter having abrupt rear cutting edges, Fig. 2. The bundles are detained pending the separation of the bands by means of a transverse plate 20, the lower portion of which is bent in the form of an elbow 21, with teeth 22 along its lower edge. This plate is supported from a cross-rod 24, connected with the rack-bars 25, which are adjusted by means of a crank 26, cross-shaft 27, and pinions 28 to lift or depress the plate.

It will be observed that the crank-shaft 12 is located underneath the feed-board 10 and the crank-arms project alternately in opposite directions. As one of the bars 11 is journaled to each crank-arm, it is obvious that these bars will reciprocate in alternation, each bar being depressed and drawn toward the front and then lifted and pushed rearwardly to advance the stalks in the direction of the snapping-rollers, while the teeth *g* of the band-cutting blades enter the bundle preparatory to severing the bands. When the bundle comes in contact with the plate 20, it engages in the angle of the elbow 21, which prevents it from being lifted along the surface of the plate 20, the bundle being thus held by the plate 20 until the bands are severed by the action of the teeth *g*, whereupon some of the stalks will drop into the channels formed by the depression of the bars 11 in a position to be advanced by the next succeeding upward and rearward movement of such bars, the adjacent bars being depressed and receiving stalks during the stalk-advancing movement of the first-mentioned bars. As each bar is depressed and receives stalks from the bundle such stalks will drop out of contact with the plate 20, and they are therefore free to be pushed under the plate by the bar when the latter is again elevated. In this manner the entire bundle becomes separated and distributed by the successive action of the bars 11.

It will be observed, Fig. 3, that dependent guards 18 and 19 are provided on the respective sides of the bars 11 to prevent the stalks from dropping between adjacent bars when vertically separated. When the stalks pass under the plate 20, they are engaged between the teeth 30 on the bars 11 and teeth 31 on rake-bars 32, the latter being suspended at one end from a cross-rod 34 by means of links 35, while their other ends are supported by the crank-arms of the multiple crank-shaft 36, the rake-bars 32 being reciprocated in substantially the same manner as the bars 11. An elbow-lever 38 supports the cross-rod 34 at each end, the levers being pivoted to the frame at each side at 39 and locked by means of a latch 40 engaging in the notches of a sector-bar 41 in a well-known manner. It will be observed that the links 35 are provided with loops 45, of considerable length, through which the cross-rod 34 passes. With this construction the rake-bars are permitted to lift and ride upon the stalks independently of the position of the cross-rod 34.

One of the crank-arms of the crank-shaft 36 is connected with the plate 20 by means of a link 50, the motion of the crank-shaft 36 being thereby utilized to impart a reciprocating movement to the plate 20, which facilitates the release of the stalks as the bundles are separated.

The front ends of the bars 11 are tapered and provided with metallic punching-rods 52, which are used to partially support the stalks while passing from the ear-receiving throat between the lower end of the conveyer and the snapping-rollers. The conveyer is adjusted to its forward position by means of the crank 6 and connecting-rod 7 when feeding short or broken stalks, which have a tendency to become disarranged and clog the ear-receiving throat unless the conveyer is brought into close proximity to the snapping-rollers. By adjusting the conveyer into such position, however, the punching-rods 52 are utilized to force these short stalks between the snapping-rollers and prevent them from clogging the throat.

Briefly reviewing the operation of the machine, the bundles are placed upon the receiving-board 10, when their forward ends will be engaged by the notched edges of the plates 16 and each bundle advances until it comes into contact with the plate 20, whereupon the movement of the bars 11 causes the blades 16 to enter the bundle, the teeth $g$ being brought into contact with the band and cutting it. As the cranks of the crank-shaft 12 extend alternately in opposite directions some of the bars will be depressed, while others are raised to the positions in which they are shown in the drawings, when the raised bars will support the body of the bundle, while some of the stalks drop between the raised bars to the depressed bars, the oscillation of the plate 20 being effective to permit the release of such stalks from the angular bend or elbow 21. The continued revolution of the crank-shaft 12 then lifts the bars with the released stalks and advances them step by step underneath the plate 20 until they are engaged by the rake-teeth 31, whereupon the coöperative action of the rake-teeth 31 and the teeth 30 on the lower ends of the bars 11 drives the stalks forcibly between the snapping-rollers, the bars 32 serving to hold the stalks down upon the bars 11 and preventing them from becoming disarranged unless they are broken in short pieces. In the latter case the adjustment of the conveyer into close proximity with the snapping-rollers facilitates the delivery of the short pieces between the rollers.

Having thus described my invention, what I claim as new, and desire to secure by Letters Patent, is—

1. The combination of the snapping-rollers of a corn-husking machine; of a multiple crank-shaft, having crank-arms extending in opposite directions; a set of feeding-bars journaled to the crank-arms; an elbow-plate located in the path of stalks advanced by said bars; and toothed band-cutting blades connected with the bars, said elbow-plate having its lower ends in such proximity to the bars as to prevent the passage of the bundles, while permitting the passage of the separated stalks.

2. The combination with the snapping-rollers of a corn-husking machine; of a multiple crank-shaft, having crank-arms extending in opposite directions; a set of feeding-bars journaled to the crank-arms; an elbow-plate located in the path of stalks advanced by said bars; toothed band-cutting blades connected with the bars, said elbow-plate having its lower ends in such proximity to the bars as to prevent the passage of the bundles, while permitting the passage of the separated stalks; and means for adjusting said plate.

3. The combination with the snapping-rollers of a corn-husking machine; of a multiple crank-shaft, having crank-arms extending in opposite directions; a set of feeding-bars journaled to the crank-arms; an elbow-plate located in the path of stalks advanced by said bars; toothed band-cutting blades connected with the bars, said elbow-plate having its lower ends in such proximity to the bars as to prevent the passage of the bundles, while permitting the passage of the separated stalks; and means for oscillating said plate longitudinally of the bars.

4. The combination with the snapping-rollers of a corn-husking machine; of a multiple crank-shaft, having crank-arms extending in opposite directions; a set of feeding-bars journaled to the crank-arms; an elbow-plate located in the path of stalks advanced by said bars; toothed band-cutting blades connected with the bars, said elbow-plate having its lower ends in such proximity to the bars as to prevent the passage of the bundles, while permitting the passage of the separated stalks; together with a multiple crank-shaft located above the bars between said plate and the snapping-rollers; rake-bars journaled to the cranks of said shaft near one end, and loosely linked at the other end to a transverse support, said rake-bars having teeth projecting downwardly in the direction of the stalk-advancing bars.

5. The combination with the snapping-rollers of a corn-husking machine; of a multiple crank-shaft, having crank-arms extending in opposite directions; a set of feeding-bars journaled to the crank-arms; an elbow-plate located in the path of stalks advanced by said bars; toothed band-cutting blades connected with the bars, said elbow-plate having its lower ends in such proximity to the bars as to prevent the passage of the bundles, while permitting the passage of the separated stalks; together with a multiple crank-shaft located above the bars between said plate and the snapping-rollers; rake-bars journaled to the cranks of said shaft near one end, and loosely linked at the other end to an adjustable transverse support, said rake-bars having teeth projecting downwardly in the direction of the stalk-advancing bars.

6. The combination with the snapping-rollers of a corn-husking machine; of a multiple crank-shaft, having crank-arms extending in opposite directions; a set of feeding-bars journaled to the crank-arms; an elbow-plate located in the path of stalks advanced by said bars; toothed band-cutting blades connected with the bars, said elbow-plate having its lower ends in such proximity to the bars as to prevent the passage of the bundles, while permitting the passage of the separated stalks; together with a multiple crank-shaft located above the bars between said plate and the snapping-rollers; rake-bars journaled to the cranks of said shaft near one end, and loosely linked at the other end to an adjustable transverse support, said rake-bars having teeth projecting downwardly in the direction of the stalk-advancing bars; and a link connection between the rake-operating crank-shaft and the bundle-detaining plate, whereby the latter is oscillated.

In testimony whereof I affix my signature in the presence of two witnesses.

ALFRED YATES.

Witnesses:
BURR ANLSEBROOK,
ELMER L. BINGHAM.